2,764,505

METHOD OF COATING SILICONE RUBBER ARTICLE AND PRODUCT RESULTING THEREFROM

Frederick L. Kilbourne, Jr., Woodmont, and Thomas S. Moroney, Wallingford, Conn., assignors to The Connecticut Hard Rubber Company, New Haven, Conn., a corporation of Connecticut No Drawing. Application July 27, 1954,
Serial No. 446,177

10 Claims. (Cl. 117—65)

This invention relates to protective sheathings for organopolysiloxane elastomers, and more particularly to a method for securely bonding a layer or layers of resistant material to the exposed surfaces of gaskets, packings, fabrics and sheet material formed of or coated with such organopolysiloxanes, which is capable of withstanding severe distortion and flexing stresses.

The advantageous qualities of organopolysiloxane elastomers in the retention of tensile strength, compressibility, elongation and dielectric characteristics over ordinary organic rubbers at relatively high temperatures is well recognized and utilized in the art. It is also recognized, however, that such elastomers do not have the required resistance in certain applications to strong acids, alkalies and special hydrocarbon solvents.

There have been efforts to protect the exposed surfaces of organopolysiloxane bodies by the application of layers of more resistant materials, the adherence being obtained by means of solvents, cements and similar expedients, for example, and sheathings of polytetrafluoroethylene resins have been suggested for such application.

This invention provides a novel method for the application of a protective sheath or film of highly resistant polytetrafluoroethylene resin material to the surface of the organopolysiloxane bodies, said sheath or film being fused onto the surface to form a more permanent film over the organopolysiloxane rubber than heretofore believed feasible.

The elastomeric organopolysiloxanes, in connection with which this invention has special application, are generally of the type described in the Jones patent, 2,448,530, and the references referred to therein. Such elastomers are formed by the heat treatment and curing of highly viscous or semi-solid masses of convertible silicone compositions such as convertible dimethyl polysiloxane and convertible methyl-phenyl polysiloxane. Cured organopolysiloxane materials of the foregoing character from rubberlike solids which desirably retain their physical characteristics up to temperatures of 480° F. and periodic or intermittent temperatures of up to about 600°. Over 600°, however, the elastomeric products in general undergo a degree of deterioration or decomposition with accompanying loss of physical properties when maintained at such elevated temperatures for any length of time.

We have discovered that organopolysiloxane rubbers may be effectively protected by a sheating or film of polytetrafluoroethylene resin by a method which involves the flash fusion of the coated product at an elevated temperature substantially above the temperature at which decomposition or deterioration of the organopolysiloxane usually occurs. In accordance with the invention, a thin coating of the polytetrafluoroethylene resin is applied to the surface of the organopolysiloxane and the product subjected to an oven temperature of from about 720 to about 900° F. or higher.

The exact time of fusion depends on the intensity of the heat source, the size and shape of the organopolysiloxane core, the thickness of the coating, and rapidity of quenching.

At oven temperatures of about 720° F. it has been observed that the polytetrafluoroethylene skin on the surface of the organopolysiloxane will become fused in a period of about one or two minutes without injury to the silicone core. A desirable fusion of the coating is also obtained at oven temperatures of about 780° to 790° F. at a time period of around one minute and 15 seconds, followed by immediate quenching.

Various mediums may be employed for heating the coating to fusion temperature, and liquid baths such as fused salt baths, low-melting-point alloy baths and high-boiling-point liquid baths, electrical magnetic field capacity heaters, and the like, may be advantageously employed. In the case of the liquid baths, fusion of the polytetrafluoroethylene coating is practically instantaneous, and should be followed by immediate quenching. Exact temperature measurements of the polytetrafluoroethylene coating have established that the minimum temperature of the coating at the time fusion occurs lies within the range of about 660–720° F. When the film reaches these temperatures, fusion of the film is rapid and in most cases, depending upon the thickness of the film, will occur in a matter of seconds. In oven heating, the coating on the silicone rubber articles will reach the minimum temperature range of 660 to 720° F. in approximately from one to two minutes, whereupon substantial immediate fusion of the coating will occur and the products are then immediately quenched.

It is found that under these conditions the organopolysiloxane does not reach the critical decomposition temperature of 500° F. within the time period of exposure. Moreover, the rubber material when tested is found to have retained its original physical properties unimpaired, including tensile strength, elongation and tear resistance.

The material preferred is Teflon, a polytetrafluoroethylene resin marketed by du Pont. It may be applied to the surface in a variety of ways as by dipping, spraying, brushing or the like, and is preferably incorporated in an aqueous dispersion. The surface to be coated may be given a spray coating of the resin to the extent of a thin film having a thickness of about ½ to 1 mil. The product is then placed in an oven, preheated to within the indicated temperature range, and allowed to remain there for a time period which depends upon the specific temperature employed. It is then removed from the oven and immediately quenched in cold water at about room temperature. Subsequent layers of resin are then applied with intermediate baking treatments and immediate quenching until a thickness of about 5 mils is obtained by the application of 5 to 7 coats of the resin.

In certain cases, a single coat of polytetrafluoroethylene resin to diaphragms, gaskets and packing rings will suffice. For example, it is possible to strengthen and increase the chemical resistance of thin diaphragms for specialized applications involving continual flexing by the application of a single coating of the resin followed by baking and quenching in the manner described.

The following examples will illustrate the practice of the invention:

*Example 1*

Corrugated rings of polydimethylsiloxane rubber, for example, of the type described in copending application, Serial No. 407,525, filed February 1, 1954, having an inside diameter of 1½ inches and a thickness of 3/16 inch were spray-coated with polytetrafluoroethylene resin to a thickness of approximately 1 mil. These rings were then placed in an oven at a temperature of 750° F. for a period of 1 minute whereupon they were quickly removed and immediately quenched in cold water at room temperature.

This procedure was repeated until a thickness of approximately 5 mils of the resin was obtained.

Example 2

A sheet of polydimethyl silicone rubber was spray-coated with a thin layer of polytetrafluoroethylene resin to an approximate thickness of 1 mil. The sheath was then immersed in a liquid salt bath maintained at a temperature of approximately 700° F., whereupon the fusion of the coating was practically instantaneous. The sheath was quickly removed from the salt bath and quenched in cold water. On examination, it was found that the silicone rubber base was unaffected by the heat treatment and a smooth uniform coating of polytetrafluoroethylene was obtained.

Example 3

Organopolysiloxane washers having a ½ inch outside diameter and a ¼ inch inside diameter and a ⅛ inch thickness were sprayed with polytetrafluoroethylene and placed in an oven at 770° F. for 30 seconds. The washers were removed and immediately quenched as before, and the operation repeated until the coating of polytetrafluoroethylene had reached a thickness of about 2 mils. The coating was found to be permanently fused to the synthetic rubber and to possess an exceptional degree of resistance to acids, alkalies and special hydrocarbon solvents and lubricants.

Example 4

Thin diaphragms of organopolysiloxane having a thickness of less than 1/16 inch were sprayed with a single coat of Teflon resin in aqueous dispersion and then fused for a period of about 30 seconds at a temperature of 750° F. due to the thinness of the base material. The diaphragms were removed and immediately quenched in cold water. When tested, it was found that this single thin coating of polytetrafluoroethylene resin provided a high degree of chemical resistance and reinforced the diaphragm to substantially increase its flex life.

Example 5

A glass fabric was coated and impregnated with polydimethylsiloxane elastomer and thereafter sprayed with polytetrafluoroethylene resin. It was then placed in an oven and the coating fused for a period of one minute at a temperature of 750° F., whereupon it was removed and immediately quenched in cold water. The product was found to have a nonsticky surface with excellent electrical properties and resistance to moisture absorption.

One of the main advantages of polytetrafluoroethylene-coated organopolysiloxane seals is their high resistance to diester lubricants such as those utilized at high-temperature operation in jet engines, as well as their resistance to corrosive rocket fuels.

Furthermore, the sealing problem on fuel systems of jet airplanes requires the use of fuel-resistant and heat-resistant seals which can best be made by coating organopolysiloxane rings with polytetrafluoroethylene as shown herein.

With airplanes reaching supersonic speeds, the air frame tends to become extremely hot from friction with the atmosphere. Therefore, in addition to hot fuels and hot lubricants, hot hydraulic fluids present sealing problems which can best be solved by means of the polytetrafluoroethylene sheathed organopolysiloxane rubber rings described above.

The polytetrafluoroethylene-coated organopolysiloxane seals are likewise equally useful at the opposite end of the temperature scale. When airplanes reach high altitudes, they encounter very low temperatures. Such temperatures are also encountered on the ground at Arctic air bases. Since the organopolysiloxane rubber core can be provided with cold resistance down to less than −100° F., and since the polytetrafluoroethylene coating, although stiff, is not brittle at −100° F., the composite ring made from these two materials has useful sealing properties at extremely low temperatures, as well as at extremely high temperatures.

What we claim is:

1. The method of coating silicone rubber articles which comprises coating the articles with a layer of polytetrafluoroethylene resin, rapidly heating the articles to approximately the fusion point of the polytetrafluoroethylene resin, and immediately cooling the articles.

2. A polydimethylsiloxane rubber product having a fused coating of polytetrafluoroethylene, when prepared by the method of claim 1.

3. The method of coating silicone rubber articles which comprises coating said articles with a layer of polytetrafluoroethylene resin, heating said articles until the coating reaches a temperature of approximately 660–720° F., and immediately thereafter quenching the articles.

4. The method set forth in claim 3 wherein the articles are allowed to remain within the indicated temperature range for a period of no longer than 15 seconds.

5. The method of improving the chemical resistance of elastomeric silicone rubber articles which comprises coating the articles with a layer of polytetrafluoroethylene resin and subjecting the coated product to an oven temperature of about 720° to about 800° F. for a maximum time period of from about 1½ minutes at the lower temperature to a maximum time period of about 30 seconds at the higher temperature.

6. The method of improving the chemical resistance of elastomeric silicone rubber articles which comprises coating the articles with a layer of polytetrafluoroethylene resin and subjecting the coated product to an oven temperature of about 720 to 750° F. for a time period of from about 1½ minutes at the lower temperature and to about 30 seconds at the higher temperature.

7. The method of improving the chemical resistance of elastomeric silicone rubber articles which comprises coating the articles with a layer of polytetrafluoroethylene resin and subjecting the coated product to a temperature of about 720 to 750° F. for a time period of about 1 minute.

8. The method of improving the chemical resistance of elastomeric polydimethylsiloxane rubber articles which comprises coating the articles with a layer of polytetrafluoroethylene resin and subjecting the coated product to a temperature of from about 720 to 750° F. for a time period of from about 1½ minutes to about 30 seconds.

9. A polydimethylsiloxane rubber product having a fused coating of polytetrafluoroethylene when prepared by the method of claim 8.

10. The method of improving the chemical resistance of elastomeric methyl phenyl polysiloxane rubber articles which comprises coating the articles with a layer of polytetrafluoroethylene resin and subjecting the coated product to a temperature of from about 720 to 750° F. for a time period of from about 1½ minutes to about 30 seconds.

References Cited in the file of this patent

UNITED STATES PATENTS

| Number | Name | Date |
|---|---|---|
| 2,427,183 | Berry | Sept. 9, 1947 |
| 2,448,530 | Jones | Sept. 7, 1948 |
| 2,454,625 | Bondon | Nov. 23, 1948 |
| 2,459,653 | Keyes | Jan. 18, 1949 |
| 2,557,928 | Atkinson | June 26, 1951 |
| 2,567,162 | Sanders | Sept. 4, 1951 |
| 2,597,976 | Cousins | May 27, 1952 |
| 2,695,246 | Jurgensen et al. | Nov. 23, 1954 |